United States Patent
Haley et al.

(10) Patent No.: US 8,207,248 B2
(45) Date of Patent: Jun. 26, 2012

(54) POLYETHYLENE COMPOSITION HAVING REDUCED WARPAGE IN MOLDED ARTICLES

(75) Inventors: Jeffrey C. Haley, Cincinnati, OH (US); Robert L. Sherman, Jr., Blue Ash, OH (US); Edward S. Vargas, Loveland, OH (US); Douglas D. Keller, Mason, OH (US); Jeffrey J. Strebel, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 12/658,905

(22) Filed: Feb. 17, 2010

(65) Prior Publication Data

US 2011/0201729 A1    Aug. 18, 2011

(51) Int. Cl.
 *C08K 5/34*   (2006.01)
 *C08K 5/00*   (2006.01)
(52) U.S. Cl. .......................................... 524/88; 524/87
(58) Field of Classification Search ............. 524/88
 See application file for complete search history.

(56) References Cited

U.S. PATENT DOCUMENTS

| 4,467,061 A * | 8/1984 | Yamamoto et al. ............. 524/87 |
| 6,555,604 B1 | 4/2003 | Sidqi |
| 7,153,358 B2 | 12/2006 | Weber et al. |
| 2005/0029763 A1 * | 2/2005 | Hassell ...................... 280/47.26 |
| 2010/0204381 A1 * | 8/2010 | Heck ............................ 524/447 |

OTHER PUBLICATIONS

Raghu et al., Journal of Minerals & Materials Characterization & Engineering, vol. 5, No. 1, pp. 87-100, 2006.*
Dr. Axel Grimm, "Low Warping Pigments for the Coloration of Molded Articles," *GBU Performance Chemicals, BASF Aktiengesellschaft*, G-EVP/PP-J550, D-67056 Ludwigshafen, Germany, (Proceedings of the 4$^{th}$ European Additives & Colors Conference, Mar. 16-17, 2005).
G. Wypych, "TALC", Handbook of Fillers, 2nd Edition, Chapter 2.1.54, pp. 150-153, 1999, ChemTec, Toronto, New York.
PCT International Search Report, WIPO, Mar. 30, 2011.

* cited by examiner

*Primary Examiner* — Ling Choi
*Assistant Examiner* — Hui Chin

(57) ABSTRACT

Disclosed is a colored high density polyethylene composition. The composition comprises a high density polyethylene, phthalocyanine blue, and talc. The composition exhibits reduced warpage in molded articles compared to those which do not contain talc. The composition is useful for injection molding and many other applications where a blue color is needed and low warpage is desired.

12 Claims, No Drawings

POLYETHYLENE COMPOSITION HAVING REDUCED WARPAGE IN MOLDED ARTICLES

FIELD OF THE INVENTION

The invention relates to a colored polyethylene composition. More particularly, the invention relates to a colored polyethylene composition which has reduced warpage in molded articles.

BACKGROUND OF THE INVENTION

High density polyethylene (HDPE, density from 0.941 g/cm$^3$ to 0.965 g/cm$^3$) is commonly used for injection molding applications. HDPE resins have excellent tensile strength, abrasion resistance, stress crack resistance, and chemical resistance. They are used for making crates, boxes, refuse carts, and waste bins. One problem associated with injection molding of HDPE is that HDPE resins often exhibit high warpage in molded articles, particularly when they are used with certain colorants or pigments. Warpage is caused by uneven shrinkage in the machine and transverse directions.

Many new pigments have been developed for HDPE coloration. See, for example, U.S. Pat. Nos. 6,555,604 and 7,153,358. These new pigments may offer reduced warpage to molded articles from the colored HDPE. However, they are more expensive than the traditional pigments such as phthalocyanine blue. New colored HDPE compositions are needed. Ideally the new colored HDPE composition uses traditional pigments and has minimum warpage in injection or other molding applications.

SUMMARY OF THE INVENTION

The invention is a colored polyethylene composition. The composition comprises a high density polyethylene (HDPE), phthalocyanine blue, and talc. Preferably the talc is exfoliated. The composition of the invention offers reduced warpage to molded articles therefrom compared to the compositions which contain phthalocyanine blue but no talc. The composition of the invention is useful for making molded articles where a reduced warpage is desired.

DETAILED DESCRIPTION OF THE INVENTION

The invention is a colored polyethylene composition. The composition comprises a high density polyethylene (HDPE), phthalocyanine blue, and talc. Phthalocyanine blue introduces color to the composition, while the talc is present to reduce or eliminate warpage induced by phthalocyanine blue.

Suitable HDPE for the composition of the invention includes those available in the industry. The HDPE has a density preferably greater than or equal to 0.938 g/cm$^3$, more preferably greater than or equal to 0.941 g/cm$^3$, and most preferably greater than or equal to 0.945 g/cm$^3$.

Preferably, the HDPE has a melt index MI$_2$ within the range of 0.05 to 50 dg/min. More preferably, the HDPE has an MI$_2$ within the range of 0.1 to 20 dg/min. Most preferably, the HDPE has an MI$_2$ within the range of 0.5 to 10 dg/min. Suitable is HDPE preferably has a melt flow ratio MFR less than or equal to 65. More preferably, the HDPE has an MFR less than or equal to 40. Most preferably, the HDPE has an MFR less than or equal to 26. MFR is the ratio of HLMI/MI$_2$. HLMI is a high load melt index. The MI$_2$ and HLMI can be measured according to ASTM D-1238. The MI$_2$ is measured at 190° C. under 2.16 kg weight. The HLMI is measured at 190° C. under 21.6 kg weight.

Preferably, the HDPE has a crystallization half-time greater than or equal to 4 minutes. More preferably, the HDPE has a crystallization half-time greater than or equal to 5 minutes. The crystallization half-time can be measured by a TA Instruments Differential Scanning Calorimeter (model Q1000). Samples are heated at 160° C. for 5 minutes, then cooled at a rate of 60° C./min to 123° C., and allowed to crystallize at 123° C. for 30 min. The heat flow (i.e., heat of crystallization) is measured. The crystallization half-time is taken as the time required for accumulated heat flow to reach 50% of the total heat released by the sample.

Suitable talcs include those known to the industry. The talc is preferably ultrafine ground talc with a high aspect ratio and small median particle size. Preferably the talc has a median particle size less than 10 microns and more preferably less than 2 microns. Preferably the talc particles are exfoliated or delaminated allowing for maximum available surface area and high aspect ratio. Optionally the exfoliated particles may then be compacted to allow for higher bulk densities and easier handling. Talc particles with high aspect ratios and small median particle sizes are preferably chosen because the smaller particles will allow for more surface area and higher aspect ratio particles are needed for alignment of the particles with the flow of the polymer.

Phthalocyanine blue is used to introduce a blue color to the polyethylene composition. It can be used together with other pigments to achieve various colors. It is used preferably within the range of 0.02 wt % to 5 wt %, more preferably within the range of 0.05 wt % to 2 wt %, and most preferably within the range of 0.1 wt % to 1 wt %, of the composition. One problem associated with the use of phthalocyanine blue is that it causes warpage in the molded articles. We found that adding talc to the phthalocyanine blue-containing HDPE can reduce or eliminate the warpage induced by phthalocyanine blue. Preferably, talc is used in an amount within the range of 0.05 wt % to 10 wt %, more preferably within the range of 0.05 wt % to 2 wt %, and most preferably within the range of 0.1 wt % to 1 wt %, of the composition.

Warpage is caused by uneven shrinkage in the machine and transverse directions. A method developed by BASF Colors & Additives (see Axel Grimm, "Low Warping Pigments for the Coloration of Molded Articles," Proceedings of the 4th European Additives & Colors Conference, 16-17 March 2005) can be used to correlate warpage with shrinkage. In this method, an internal factor in the transverse direction IF$_{TD}$ is calculated based on the difference in shrinkage in the transverse direction between an unpigmented polymer sample and a pigmented polymer sample.

$$IF_{TD} = [S_{TD}(\text{unpigmented}) - S_{TD}(\text{pigmented})] / S_{TD}(\text{unpigmented}) \times 100\%$$

S$_{TD}$ is the shrinkage in the transverse direction. In general, an IF$_{TD}$ value of 0%-10% means that the pigment causes little or no warpage, a value of 11%-20% a moderate warpage, and a value greater than 20% means a high warpage. The composition of the invention results in molded articles having an IF$_{TD}$ value preferably less than 10%.

The composition of the invention can be made by blending the components. Any known blending methods including masterbatch methods can be used. Preferably the blending is performed in an extruder. Optionally, the composition of the invention contains antioxidants, UV-absorbents, light stabilizers, flow agents, and other additives. Additives are added in an amount preferably less than 15 wt %, more preferably less than 10 wt %, and most preferably less than 5 wt %, of the composition.

The composition of the invention is preferably used for injection molding applications. It is particularly useful for making refuse carts or other articles where a low warpage is essential.

The following examples merely illustrate the invention. Those skilled in the art will recognize many variations that are within the spirit of the invention and scope of the claims.

COMPARATIVE EXAMPLE 1

Low Warpage of Molded Sample of HDPE in the Absence of Phthalocyanine Blue

A high density polyethylene HDPE having a density of 0.948 g/cm$^3$ and a melt index of 5.0 g/10 min. at 190° C./2.16 kg is strand-pelletized using a co-rotating, twin-screw extruder. The resulting pellets have a crystallization half-time of 4.2 min., measured at 123° C. Test plaques are molded using a fan-gated plaque mold with the dimensions 4 in×6 in×0.125 in. Molded plaques are allowed to cool. After cooling, the dimensions of the plaques differ from the dimensions of the mold; this difference reflects the amount of sample shrinkage that occurs. The averages of the machine direction (MD) shrinkage and transverse direction (TD) shrinkage are 2.9% and 2.7%, respectively. This indicates that the molded HDPE sample has relatively even shrinkage in MD and TD, i.e., low warpage.

COMPARATIVE EXAMPLE 2

Increased Warpage of Molded Sample of HDPE Containing Phthalocyanine Blue

The general procedure of Comparative Example 1 is followed with one exception. The strand-pelletized HDPE is dry-blended with 1% by weight of a phthalocyanine blue color concentrate (available from Carolina Color). This blend is injection-molded into plaques by the same procedure of Comparative Example 1. The averages of the machine direction (MD) shrinkage and transverse direction (TD) shrinkage are 2.9% and 2.2%, respectively. The calculated IF$_{TD}$ is 18%. This indicates that phthalocyanine blue causes the molded HDPE sample to have significantly higher shrinkage in MD than TD, i.e., a high warpage.

EXAMPLE 3

Warpage of Molded Article From the Composition of the Invention

The general procedure of Comparative Example 2 is followed with one exception. An exfoliated talc (0.15% by weight, Jetfine® 3CA talc, product of Luzenac (Rio Tinto Minerals)) is compounded with the HDPE in a twin-screw extruder. The pellets produced prior to dry-blending with the phthalocyanine blue color concentrate have a crystallization half-time of 1.7 min, measured at 123° C. By comparison with Comparative Example 1, this crystallization half-time reduction indicates that the talc acts as a nucleating agent for the HDPE. The molded sample has MD and TD shrinkages of 2.9% and 2.5%, respectively. The calculated IF$_{TD}$ is 8%. The results indicate that the presence of talc increases TD shrinkage and reduces warpage caused by phthalocyanine blue.

COMPARATIVE EXAMPLE 4

Warpage of Refuse Cart Molded From HDPE Containing Phthalocyanine Blue

An HDPE resin having a density of 0.948 g/cm$^3$ and a melt index of 5.0 g/10 min. at 190° C./2.16 kg is dry-blended with 1% by weight of a phthalocyanine blue color concentrate (available from Carolina Color). This blend is injection-molded to form several refuse carts. After cooling, the carts are visually inspected for warpage. An unacceptably high level of warpage is observed.

EXAMPLE 5

Warpage of Refuse Cart Molded From the Composition of the Invention

The general procedure of Comparative Example 4 is followed except a master batch which contains 95% by weight of a linear low density polyethylene having a density of 0.929 g/cm$^3$ and a melt index of 104 g/10 min. at 190° C./2.16 kg and 5% by weight of an exfoliated talc (ULTRATALC® 609, product of Barretts Minerals Inc.) is dry-blended at 2% by weight into the dry blend composition described in Comparative Example 4. The resultant blend is injection-molded to form several refuse carts. After cooling, the carts are visually inspected for warpage. Significantly less warpage is observed compared to Comparative Example 4.

We claim:

1. A refuse cart comprising a colored polyethylene composition comprising a high density polyethylene (HDPE) that has a crystallization half-time greater than or equal to 4 minutes, measured at 123° C., phthalocyanine blue, and and exfoliated talc, and which has an internal factor in the transverse direction in an injection-molded article less than 10%.

2. The refuse cart of claim 1, wherein the HDPE has a crystallization half-time greater than or equal to 5 minutes.

3. The refuse cart of claim 1, wherein the talc has a median particle size of less than or equal to 2 microns.

4. The refuse cart of claim 1, which comprises from 0.05 wt % to 2 wt % phthalocyanine blue.

5. The refuse cart of claim 1, which comprises from 0.05 wt% to 2 wt% phthalocyanine blue.

6. A method for making a refuse cart having reduced warpage, said method comprising injection-molding the polyethylene composition of claim 1.

7. The method of claim 6, wherein the polyethylene composition comprises from 0.05 wt % to 2 wt % of the phthalocyanine blue.

8. The method of claim 6, wherein the polyethylene composition comprises from 0.05 wt % to 2 wt % of the talc.

9. A refuse cart comprising a colored polyethylene composition comprising a high density polyethylene (HDPE) that has a crystallization half-time greater than or equal to 4 minutes, measured at 123° C., phthalocyanine blue, and from 0.05 wt% to 2 wt% of talc.

10. The composition of claim 9, wherein the talc is exfoliated.

11. The composition of claim 9, wherein the talc has a median particle size of less than or equal to 2 microns.

12. A method for making an article having reduced warpage, said method comprising injection-molding the polyethylene composition of claim 9.

* * * * *